(12) United States Patent
Kabasawa

(10) Patent No.: US 6,313,968 B1
(45) Date of Patent: Nov. 6, 2001

(54) RECORDING MEDIUM RECORDING AND REPRODUCING APPARATUS

(75) Inventor: Hidetoshi Kabasawa, Saitama-Ken (JP)

(73) Assignee: Teac Corporation, Tokyo (JP)

(*) Notice: Subject to any disclaimer, the term of this patent is extended or adjusted under 35 U.S.C. 154(b) by 0 days.

(21) Appl. No.: 09/190,310

(22) Filed: Nov. 12, 1998

(30) Foreign Application Priority Data

Nov. 13, 1997 (JP) .................................... 9-312364
Nov. 13, 1997 (JP) .................................... 9-312365

(51) Int. Cl.$^7$ .................................................. G11B 17/04
(52) U.S. Cl. ................................................ 360/99.06
(58) Field of Search ........................... 360/99.06, 75, 360/99.02, 254.1, 266.2–267.9; 369/79, 75.1, 75.2, 77.1, 77.2

(56) References Cited

U.S. PATENT DOCUMENTS

| 4,709,281 | 11/1987 | Inoue et al. ............................ 360/97 |
| 5,025,437 | * 6/1991 | Yamashita et al. ................... 369/79 |
| 5,237,473 | * 8/1993 | Yoshida ............................. 360/99.06 |
| 5,446,606 | * 8/1995 | Brunner et al. ....................... 360/75 |
| 6,018,433 | * 1/2000 | Thayne et al. ........................ 360/69 |

FOREIGN PATENT DOCUMENTS

| 68769 | * 4/1986 | (JP) . |
| 57453 | * 3/1989 | (JP) . |
| 6-162704 | 6/1994 | (JP) . |

* cited by examiner

Primary Examiner—A. J. Heinz
Assistant Examiner—Angel Castro
(74) Attorney, Agent, or Firm—Anderson, Kill & Olick, P.C.

(57) ABSTRACT

A recording medium recording and reproducing apparatus prevents a recording medium from being ejected when information is being recorded on the recording medium. A recording medium conveying mechanism conveys the recording medium from an insertion/eject position to a loading position. The recording medium is inserted or ejected at the insertion/eject position, and is loaded for a recording or reproducing operation at the loading position. A head writes information on the recording medium or reads information recorded on the recording medium. A head moving mechanism moves the head to a recording and reproducing position at which the head performs a recording or reproducing operation. The head is moved in association with conveyance of the recording medium by the recording medium conveying mechanism. The head moving mechanism locks the recording medium conveying mechanism when the recording medium is positioned at the loading position. Additionally, the head moving mechanism stepwisely moves the head from the insertion/eject position to the loading position.

7 Claims, 11 Drawing Sheets

(EJECT MODE)

( RECORDING AND REPRODUCING MODE )

FIG. 9A  (EJECT MODE)
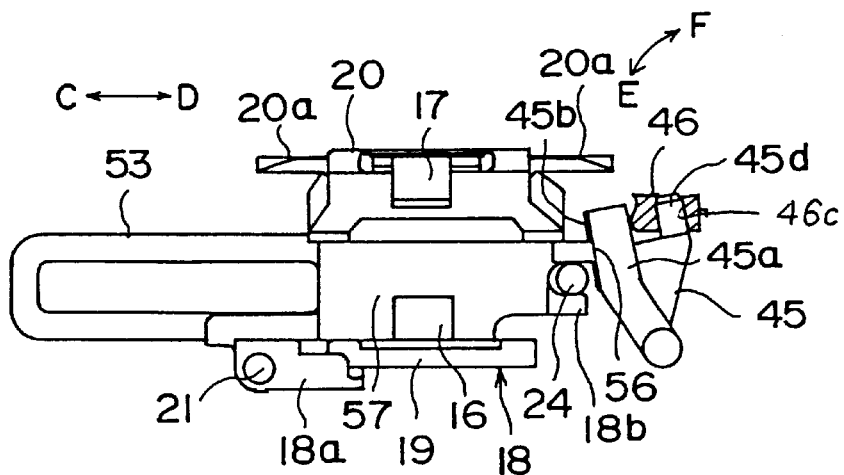
FIG. 9B  (WAITING MODE)
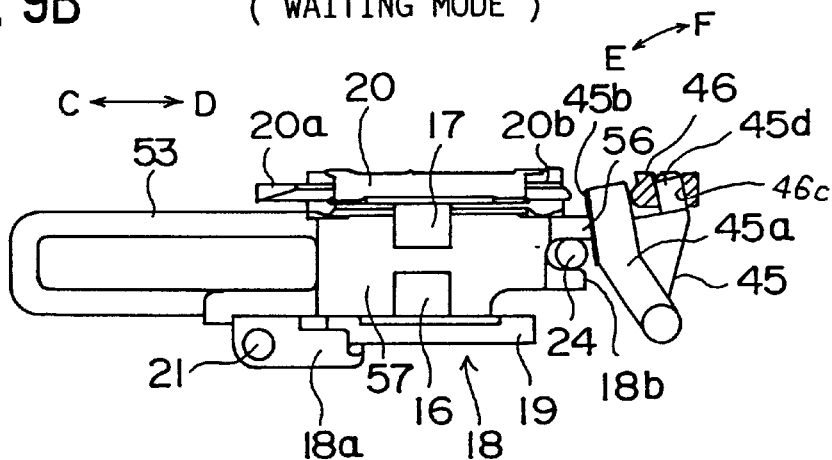
FIG. 9C  (RECORDING AND REPRODUCING MODE)
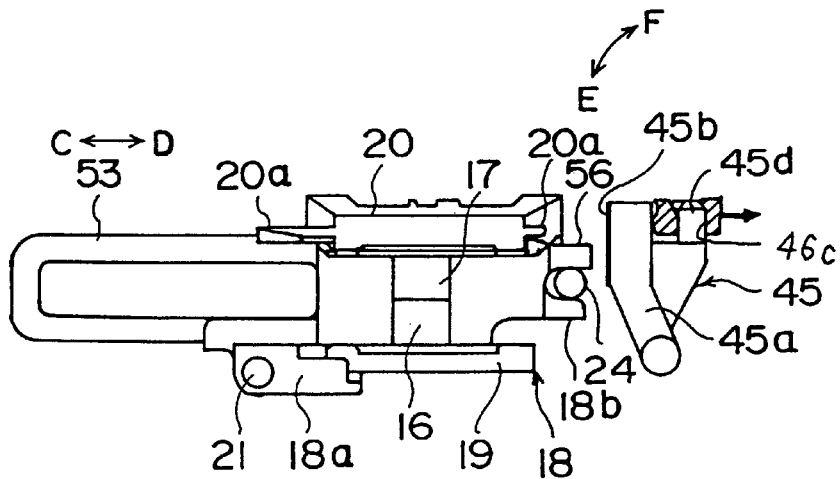

FIG. 10A  (EJECT MODE)
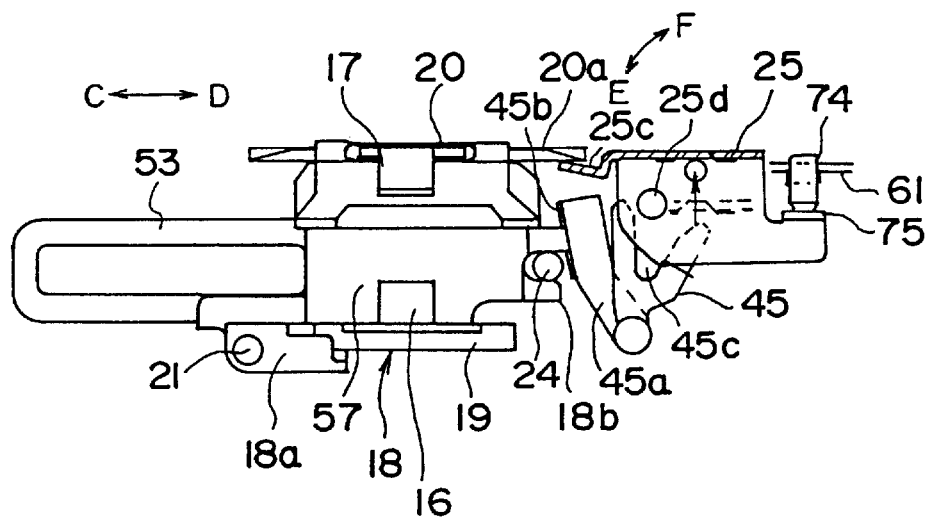
FIG. 10B  (WAITING MODE)
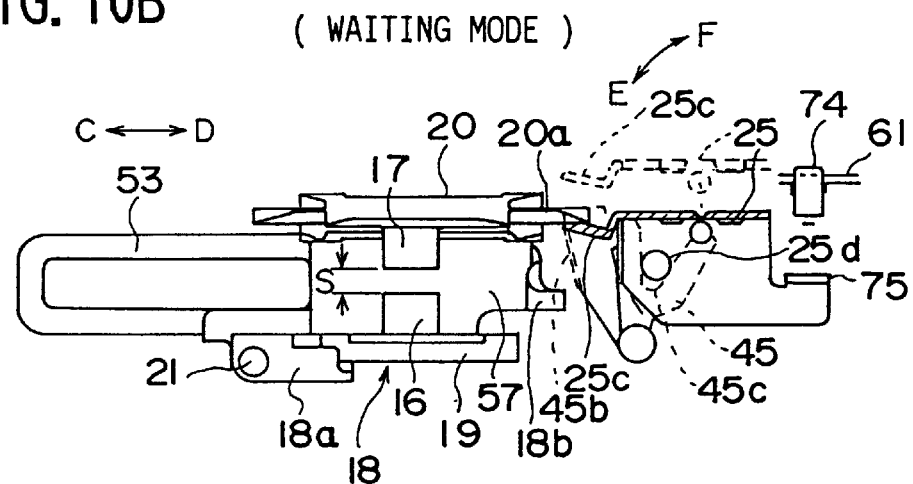
FIG. 10C  (RECORDING AND REPRODUCING MODE)
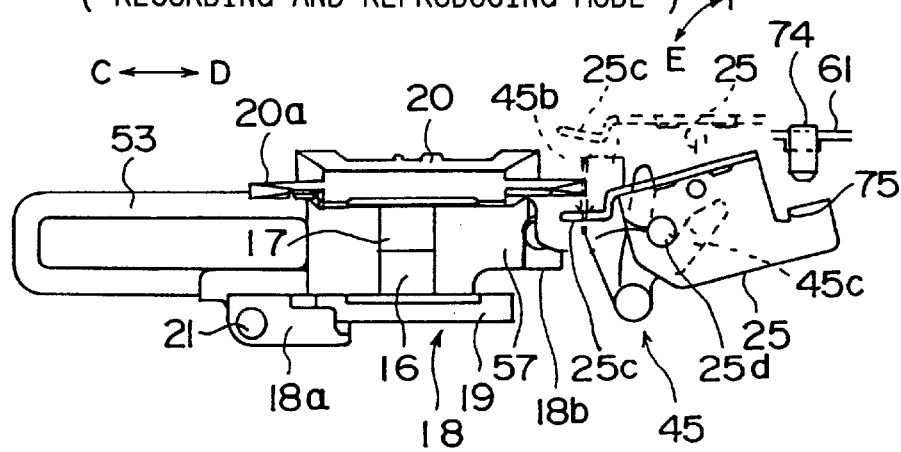

RECORDING MEDIUM RECORDING AND REPRODUCING APPARATUS

BACKGROUND OF THE INVENTION

1. Field of the Invention

The present invention relates to a recording medium recording and reproducing apparatus and, more particularly, to a recording medium recording and reproducing apparatus in which a head is moved adjacent to a recording medium in association with conveyance of the recording medium by a recording medium conveying mechanism.

2. Description of the Related Art

An electronic apparatus such as a personal computer or a word processor is provided with a magnetic disc apparatus as means for recording information. In a magnetic disc apparatus, when a disc cartridge is attached, a magnetic disc in the disc cartridge is rotated so as to perform a magnetic recording or reproducing operation by a magnetic head being made contact with the magnetic disc.

Additionally, the above-mentioned magnetic disc apparatus is provided with a recording medium conveying mechanism that comprises a disc holder into which the disc cartridge is inserted and a slider which slides by an inserting operation of the disc cartridge so as to move the disc holder from a cartridge insertion/eject position to a cartridge loading position.

The slider is urged by a coil spring in one direction. When the disc cartridge is inserted, a latch lever is pressed by an end of the disc cartridge and an engagement of the slider by the latch lever is released. Thereby, the slider moves in an urging direction so that the disc holder is moved to the cartridge loading position. At this time, the disc holder moves downwardly from the cartridge insertion/eject position to the cartridge loading position, and, thereby, the disc in the disc cartridge is loaded on a turntable.

Additionally, when the disc cartridge is ejected, an eject button provided on a front bezel is pressed so that the slider moves in an ejecting direction which causes the disc holder to move upwardly from the cartridge loading position to the cartridge insertion/eject position. At the same time, the engagement of the latch lever by the slider is released, and, thereby, the latch lever rotates while pressing the disc cartridge in the ejecting direction. As mentioned above, the disc cartridge loaded in the magnetic disc apparatus is mechanically ejected when the eject button is pressed.

However, in the above-mentioned magnetic disc apparatus, when the eject button is pressed, the disc cartridge is ejected irrespective of an operational mode of the magnetic disc apparatus. Accordingly, if the eject button is pressed while the disc cartridge is loaded and a magnetic recording or reproducing operation is being performed by a magnetic head, there is a problem in that the slider is moved in the ejecting direction and the disc holder is moved upwardly from the cartridge loading position to the cartridge insertion/eject position and, thus, the disc cartridge is ejected.

Thus, for example, there may be a case in which a disc cartridge is forcibly ejected while information is being magnetically recorded on the magnetic which causes termination of the recording operation before whole information to be recorded is completely recorded on the magnetic disc. In this case, if a power of the magnetic disc apparatus is turned off, the information to be recorded on the magnetic disc may be lost.

Additionally, in the above-mentioned apparatus, the spring urging the slider is set to generate a strong force so as to positively perform the loading operation of the disc holder. Accordingly, the slider is accelerated by the strong spring force from an initial time of insertion of the cartridge to the cartridge is loaded. Thus, a speed of the magnetic disc is excessively increased when the slider reaches an end of travel at which the speed of the slider is constant. Thus, there is a problem in that a shock of the magnetic head when contacting the magnetic disc is too strong so that the magnetic head damages a magnetic film on the magnetic disc.

In order to eliminate such a problem, the conventional apparatus is provided with a damper to reduce a speed of movement of the slider. As for such kind of damper, an oil damper may be used. The oil damper comprises a gear engaging with a rack provided to the slider, a rotating member rotating with the gear and a case in which grease is filled and the rotating member is accommodated. When the rotating member provided in the case of the oil damper is rotated due to a movement of the slider provided in the case, an attenuating force is generated by the grease filled in the case. As a result, the speed of movement of the slider is reduced.

However, in the above-mentioned magnetic disc apparatus, since viscosity of the grease filled in the oil damper depends on a temperature, a resistance of the grease may be excessively increased at a low temperature, and the magnetic disc may not be loaded reliably. On the other hand, since the resistance of the grease is decreased at a high temperature, a power of the loading operation is increased which may damage the magnetic film of the magnetic disc.

Additionally, in the recent magnetic disc apparatus, recording density is increased by increasing a rotational speed of the disc so as to increase a recording capacity of the magnetic disc. In such a magnetic disc apparatus achieving a large recording capacity, a floating force is exerted on a magnetic head due to an air flow generated in association with a high-speed rotation of the magnetic disc, and, thereby, a magnetic recording and reproducing operation can be performed while the magnetic head is slightly separated from the magnetic head so that the magnetic head does not damage the surface of the magnetic disc.

In the above-mentioned apparatus, when the magnetic head is made contact with the magnetic disc when a rotational speed of the magnetic disc is low, a floating force is not generated in the magnetic head. Thus, there is a high possibility that the magnetic head contacts the magnetic disc and the magnetic film formed on the magnetic disc is damaged.

SUMMARY OF THE INVENTION

It is a general object of the present invention to provide a novel and useful recording medium recording and reproducing apparatus in which the above-mentioned problems are eliminated.

A more specific object of the present invention is to provide a recording medium recording and reproducing apparatus which can prevent a recording medium from being ejected when information is being recorded on the recording medium.

Another object of the present invention is to provide a magnetic recording medium recording and reproducing apparatus which can prevent a damage to a magnetic film of a magnetic recording medium due to a magnetic head contacting the magnetic recording medium.

In order to achieve the above-mentioned objects, there is provided according to one aspect of the present invention a recording medium recording and reproducing apparatus, comprising:

a recording medium conveying mechanism for conveying a recording medium from an insertion/eject position to a loading position, the recording medium being inserted or ejected at the insertion/eject position, the recording medium being loaded for a recording or reproducing operation at the loading position;

a head for writing information on the recording medium or reading information recorded on the recording medium; and a head moving mechanism moving the head to a recording and reproducing position at which the head performs a recording or reproducing operation, the head being moved in association with conveyance of the recording medium by the recording medium conveying mechanism, wherein the head moving mechanism locks the recording medium conveying mechanism when the recording medium is positioned at the loading position.

According to the above-mentioned invention, the head moving mechanism locks the recording medium conveying mechanism when the recording medium moves from the insertion/eject position and reaches the loading position in which a recording and reproducing operation is performed, and, thereby, the recording medium is prevented from being ejected when information is being recorded on the recording medium or when information recorded on the recording medium is being read and information to be recorded on the recording medium is prevented from being lost.

Additionally, in the recording medium recording and reproducing apparatus according to the present invention, the recording medium conveying mechanism may include:

a holder holding the recording medium;

a slider moving the holder between the disc insertion/eject position and the loading position; and a lock member locking the head moving mechanism when the head is at a position other than the recording and reproducing position, the lock member locking the slider when the holder is at the loading position.

According to this invention, the slider cannot be moved in the eject direction when an attempt is made to eject the recording medium while a recording or reproducing operation is being performed, and, thus, an eject operation is prohibited so that information is prevented from being lost. Additionally, since the head moving mechanism is locked when the head is at a position other than the recording and reproducing position, that is, a position separate from the recording medium, the head is prevented from being damaged due to a shock in the waiting state.

Additionally, the lock member may include a solenoid and a plunger moved by the solenoid, and the plunger selectively locks one of the head moving mechanism and the recording medium conveying mechanism according to a position thereof.

Accordingly, since the head moving mechanism or the recording medium is locked by the plunger moving to one of the predetermined positions, the head moving mechanism and the recording medium conveying mechanism can be selectively locked by a single solenoid. Additionally, a locked state can be switched with a good response, and a delay in a locking operation can be prevented.

Additionally, there is provided according to another aspect of the present invention a recording medium recording and reproducing apparatus, comprising:

a recording medium conveying mechanism for conveying a recording medium from an insertion/eject position to a loading position, the recording medium being inserted or ejected at the insertion/eject position, the recording medium being loaded for a recording or reproducing operation at the loading position;

a head for writing information on the recording medium or reading information recorded on the recording medium; and a head moving mechanism moving the head to a recording and reproducing position at which the head performs a recording or reproducing operation, the head being moved in association with conveyance of the recording medium by the recording medium conveying mechanism, wherein the head moving mechanism stepwisely moves the head from the insertion/eject position to the loading position.

According to the above-mentioned invention, the head is stepwisely moved during an operation to move the recording medium from the insertion/eject position to the loading position, and, thereby the head stepwisely approaches the recording medium. Accordingly, a moving speed of the head is reduced when the recording medium is loaded and the head does not powerfully collide with the recording medium. Thus, the recording medium is prevented from being damaged by a contact of the head.

In the above-mentioned invention, the recording medium may be a magnetic disc and the head may be a magnetic head magnetically performing a recording or reproducing operation.

Additionally, the recording medium may be a disc-like recording medium, and the head moving mechanism may move the head to the recording and reproducing position when the recording medium is rotated at a predetermined speed.

According to this invention, since the head is accessed to the recording medium in a state in which the disk-like recording medium is rotated at the predetermined speed, the head can be accessed to the recording medium in a state in which a floating force is exerted on the head due to air flow generated by the rotation of the recording medium.

Additionally, operational modes of the recording medium recording and reproducing apparatus may include an eject mode for ejecting the recording medium and a waiting mode for stepwisely moving the head, and wherein the head moving mechanism may lock the head when the recording medium recording and reproducing apparatus is set to one of the eject mode and the waiting mode.

According to this invention, the head is locked in the eject mode and the waiting mode, that is, the head is locked in mode other than the recording and reproducing mode in which the head performs a recording or reproducing operation. Accordingly, the head is prevented from moving when a vibration is externally transmitted to the recording medium recording and reproducing apparatus in the eject mode or the waiting mode. Additionally, the head can be prevented form being moved when a vibration is applied during transportation.

Other objects, features and advantages of the present invention will become more apparent from the following detailed description when read in conjunction with the accompanying drawings.

BRIEF DESCRIPTION OF THE DRAWINGS

FIGS. 9A, 9B and 9C are front views for explaining an operation of a stopper with respect to the head carriage;

FIGS. 10A, 10B and 10C are front views for explaining an operation of a head carriage stopper and a lifter with respect to a head arm;

DETAILED DESCRIPTION OF THE PREFERRED EMBODIMENT

A description will now be given of a recording medium recording and reproducing apparatus according to an embodiment of the present invention.

Figure 1:
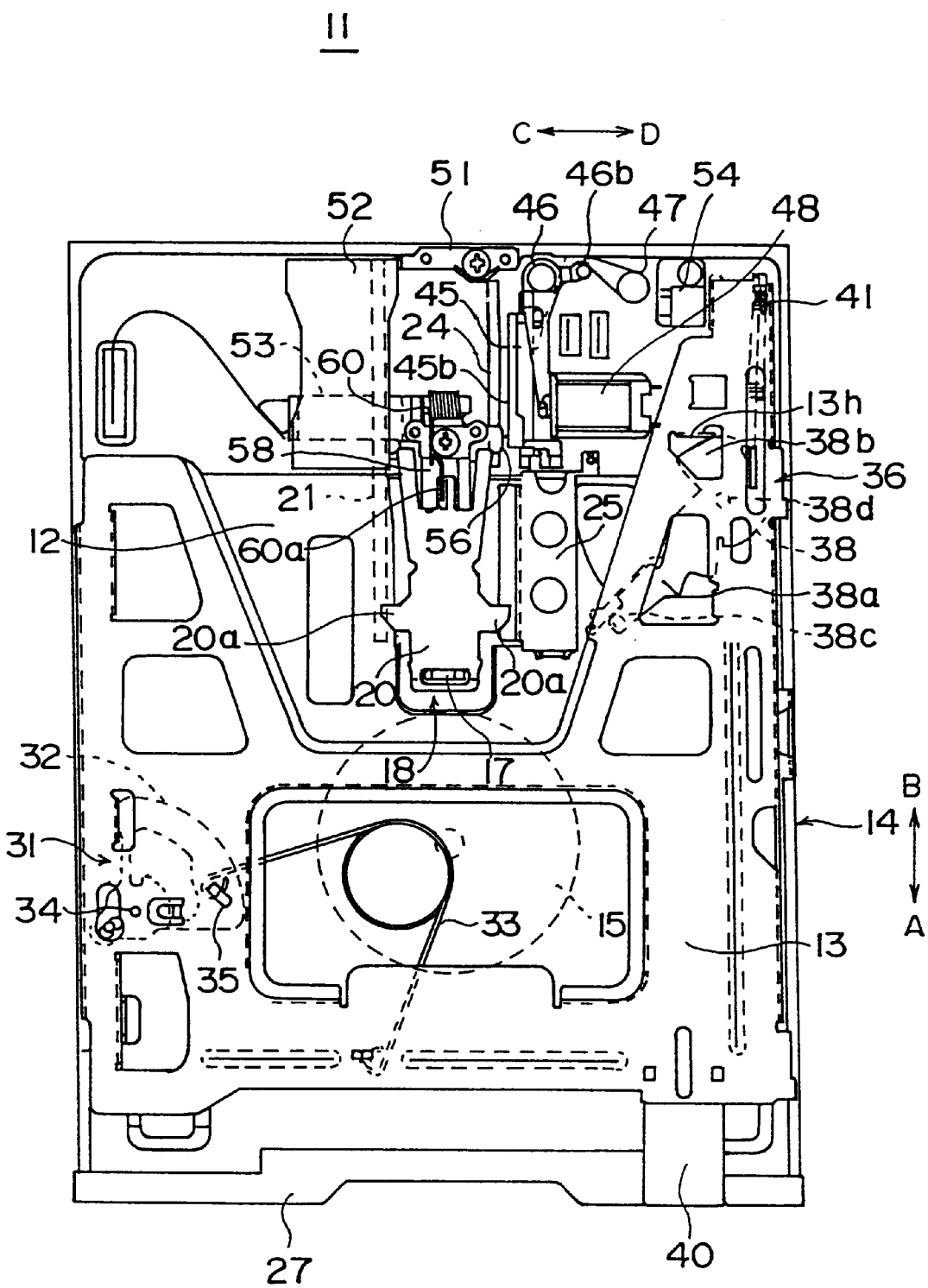
FIG. 1 is a plan view of a magnetic disc apparatus according to an embodiment of the present invention.
Figure 2:
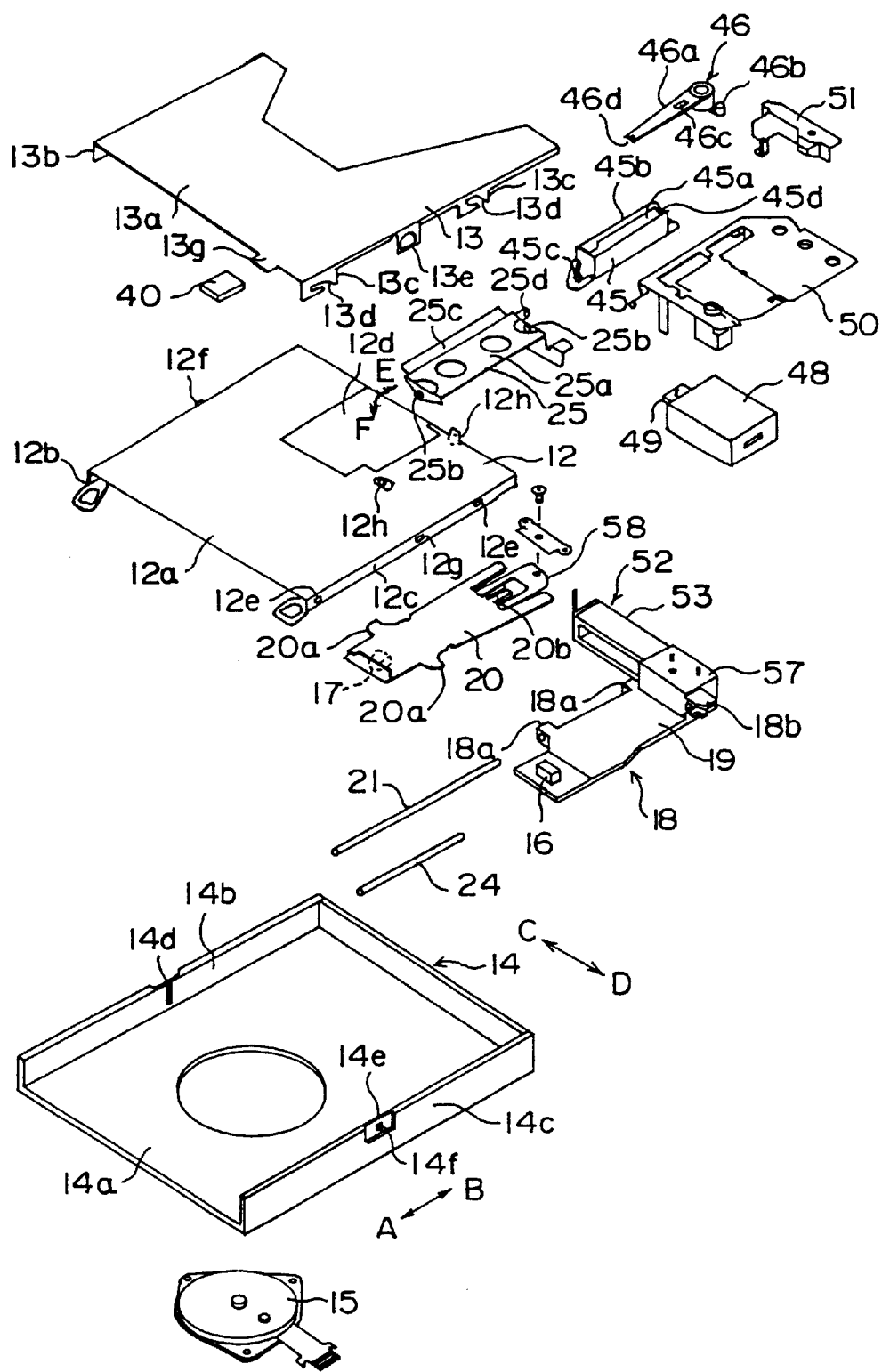
FIG. 2 is an exploded perspective view of the magnetic disc apparatus shown in FIG. 1.

FIG. 1 is a plan view of a magnetic disc apparatus 11 according to an embodiment of the present invention. FIG. 2 is an exploded perspective view of the magnetic disc apparatus 11.

As shown in FIG. 1 and FIG. 2, in the magnetic disc apparatus 11, a disc holder 12 into which a disc cartridge (not shown in the figure) is inserted and a slider 13 which moves the disc holder up and down are mounted on a frame 14. The slider 13 is slidably mounted on the frame 14 in directions indicated by arrows A and B. The slider 13 slides in the direction A by an inserting operation of the disc cartridge so as to move the holder 12 downwardly from a cartridge insertion/eject position to a cartridge loading position.

A turntable driven by a disc rotating motor and a head carriage 18 supporting magnetic heads 16 and 17 are provided on a flat surface 14a of the frame 14. Additionally, a circuit board (not shown in the figure) having a control circuit is mounted on a bottom side of the frame 14.

The head carriage 18 has a carriage body 19 which supports the lower-side magnetic head 16 on an end thereof. Additionally, the head carriage 18 has a head arm 20 which is rotatably mounted with respect to the carriage body 19 and supports the upper-side magnetic head 17 on an end thereof.

The head carriage 18 is guided and movable along guide shafts 21 and 24 extending in longitudinal directions (directions A and B). Bearing portions 18a and 18b in which the guide shafts 21 and 24 fit are provided on the left and right sides of the head carriage 18.

It should be noted that the bearing portion 18a includes a circular aperture through which the guide shaft 21 as a main guide shaft extends. The bearing portion 18a is a main bearing for limiting a position of the head carriage 18 in a direction of movement and the left and right directions and a position of the carriage 18 in a direction of the height of the head carriage 18. The bearing portion 18b is a bearing formed in a channel-like shape into which the guide shaft 21 fits. Accordingly, the bearing portion 18b does not limit a position of the head carriage 18 in the direction of movement and the left and right directions, and limits only a position in the direction of a height of the head carriage 18.

The head carriage 18 moves in the directions A and B by a drive force of a voice coil motor 52 (described later) by being guided by the guide shaft 21 and the guide shaft 24. Thereby, the magnetic heads 16 and 17 supported on the head carriage 18 can perform magnetic recording and reproducing operations by sliding on a desired track of the magnetic disc (not shown in the figure) accommodated in the disc cartridge.

A damper mechanism 31 is provided on a bottom surface of the slider 13. That is, a shaft 34 which rotatably supports a damper plate 32 of the damper mechanism 31 and an engaging portion 35 which engages an end of a torsion spring 33 are provided on the bottom surface of the slider 13.

The damper mechanism 31 is a mechanical damper mechanism which urges the slider 13 so that a speed of slide of the slider 13 is reduced by using not an oil damper but a spring force. The damper mechanism 31 comprises the damper plate 32 rotatably provided on the bottom surface of the slider 13 and the torsion spring 33 which urges the damper plate 32.

Additionally, the damper mechanism 31 urges the slider in a direction (direction B) opposite to the direction of movement at an initial stage of movement of the disc holder 12 from the cartridge insertion/eject position to the cartridge loading position. Thereby, the slider 13 is urged in the direction of movement (direction A) when the damper plate 32 rotates more than a predeterminate angle in a process of slide of the slider 13. Accordingly, the damper mechanism 31 reduces a speed of movement of the slider 13 by a spring force of the torsion spring 33 so as to reduce a speed of downward movement of the disc holder 12, that is, a disc loading speed.

A description will now be given of a structure of each of the major parts constructed as mentioned above.

The disc holder 12 comprises a top plate 12a and cartridge guide portions 12b and 12c which are bent on opposite sides of the top plate 12a so as to hold the disc cartridge. Accordingly, a space surrounded by the top plate 12a and the cartridge guide portions 12b and 12c correspond to a cartridge-accommodating portion.

The top plate 12a of the disc holder 12 is provided with an opening 12d for the head carriage 18 moving therethrough. A lifter 25 contacting protrusions 20a protruding from opposite sides of the head arm 20 is swingingly mounted on the right side of the opening 12d. Accordingly, the head arm 20 intermittently moves the magnetic head 17 up and down in association with upward and downward movement of the disc holder 12. Accordingly, the head moving mechanism is constituted by the disc holder 12, the head arm 20 and a lifter 25.

Additionally, shafts 25b protruding from opposite sides of a body 25a of the above-mentioned lifter 25, is supported by a supporting portion 12h which uprightly provided on the top plate 12a of the disc holder 12. Accordingly, the lifter 25 is mounted rotatable in directions indicated by arrows E and F perpendicular to the carriage moving directions (directions A and B).

Additionally, a pair of engaging pins 12e which engages with the slider 13 is provided on each of the opposite sides of the disc holder 12, and guide portions 12f and 12g protrude in the middle of each of the opposite sides of the disc holder 12. The guide portions 12f and 12g fit in guide grooves 14d and 14e provided on side walls 14b and 14c of the frame 14, respectively, so as to guide the upward and downward movement of the disc holder 12.

The lifter 25 is provided on the top plate 12a of the disc holder 12. An engaging portion 25c of the lifter 25 rotates so as to stepwisely move the head arm 20 downwardly by contacting the protruding portions 20a of the head arm 20. It should be noted that the engaging portion 25c is formed to have a length corresponding to a distance between the innermost track and the outermost track of the disc, that is, a length corresponding to a stroke of the head carriage 18.

The slider 13 is slidably mounted above the disc holder 12. The slider 13 comprises: a flat plate 13a having a J-letter shaped; side surfaces 13b and 13c bent downwardly on opposite sides of the flat plate 13a; a slanting groove 13d which is provided on each of the side surfaces 13b and 13c and in which the engaging pin 12e of the disc holder 12 fits; and engaging openings 13e which engage protrusions 14f protruding in the middle of each of the opposite sides of the frame 14. Additionally, the slider 13 has a protruding tab 13g protruding on a right front side of the slider 13. An eject button 40 is secured to the protruding tub 13g. The slider 13 is urged by the coil spring 41 in the direction A.

Figure 3:
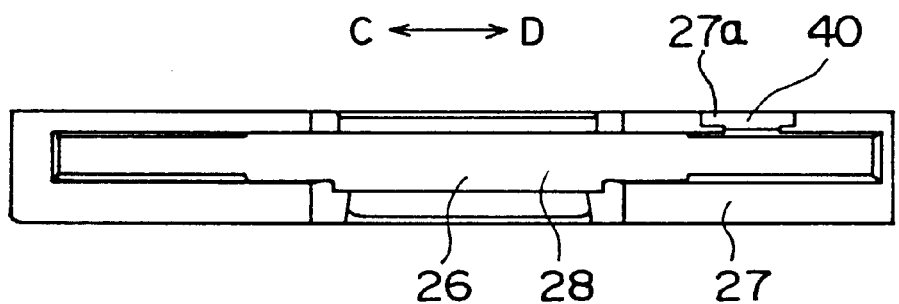
FIG. 3 is a front view of the magnetic disc apparatus shown in FIG. 1.

FIG. 3 is a front view of the disc apparatus shown in FIG. 1.

As shown in FIG. 3, a front bezel 27 having a disc insertion opening 26 is mounted on a front end of the frame 14. Additionally, a depressed portion 27a in which the eject button 40 is slidably fit is provided on the right side of an upper end of the front bezel 27. It should be noted that a flap 28 is rotatably provided on the backside of the front bezel 27 in opening and closing directions. The flap 28 closes the disc insertion opening 26 from the inner side of the apparatus.

Figure 4:
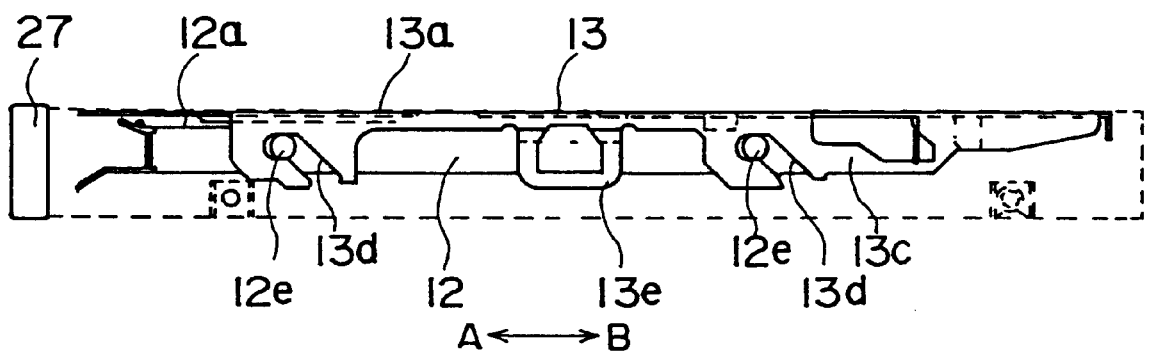
FIG. 4 is a side view of an assembly of a disc holder and a slider.

FIG. 4 is a side view of an assembly of the disc holder 12 and the slider 13.

As shown in FIG. 4, the engaging pins 12e of the disc holder 12 fit in the slanting grooves 13d of the slider 13. Accordingly, when the slider 13 moves, the engaging pins 12e are moved along the slanting grooves 13d. Thus, when the slider 13 moves in the direction B, the disc holder 12 moves upwardly to the cartridge insertion/eject position. On the other hand, when the slider 13 moves in the direction A, the disc holder 12 moves downwardly to the cartridge loading position. Accordingly, a recording medium conveying mechanism is constituted by the disc holder 12 and the slider 13.

Now, returning to FIG. 1, the description is continued.

A latch mechanism 36 comprises a latch lever 38 rotatably supported on an upper surface of the disc holder 12 and a coil spring 41 which urges the latch lever 38 in the counterclockwise direction. It should be noted that the coil spring 41 is commonly used as a slider returning spring urging the slider 13 in the direction A and a latch lever returning spring urging the latch lever 38.

The latch lever 38 comprises a lever portion 38a which opens and closes a shutter (not shown in the figure) of the disc cartridge and an arc-like engaging portion 38b which engages an engaged portion 13h of the slider 13.

When the disc cartridge is inserted into the disc holder 12, the latch lever 38 rotates in the clockwise direction by being pressed by the front edge of the disc cartridge. Then, when the arc-like engaging portion 38b is separated from the engaged portion 13h of the slider 13, the slider which is urged by the coil spring 41 slides in the direction A.

By rotating the latch lever 38 as mentioned above, an end 38c of the lever portion 38a presses the shutter (not shown in the figure) of the disc cartridge in the opening direction so that the magnetic heads 16 and 17 slidably contact the magnetic disc. Additionally, when the eject button 40 is pressed in the direction B and the slider 13 moves in the same direction, an engagement of the engaging portion 38b which has contacted a side surface of the engaged portion 13h of the slider 13 is released. Thereby, the latch lever 38 is rotated by a spring force of the coil spring 41 in the counterclockwise direction.

The carriage stopper 45 is a lock member which engages the head carriage 18 when an ejecting operation is performed as described later so as to prevent the magnetic heads 16 and 17 from moving in a radial direction of the magnetic disc (not shown in the figure) Accordingly, the stopper 45 prevents the head carriage 18 from moving in a radial direction of the disc during transportation so as to prevent a damage of the head carriage 18 due to a collision with a stopper (not shown in the figure) for a stroke end. The carriage stopper 45 is mounted so as to extend in the directions A and B so that a body portion 45a faces the right side of the guide shaft 24. The carriage stopper 45 is rotatably supported by a bearing portion (not shown in the figure) formed on the frame 14 in the directions E and F similar to the above-mentioned lifter 25. The carriage stopper 45 has a rack 45b for engaging the head carriage 18 and a V-like depressed portion 45c engaged with the engaging pin 25d protruding from an end of the lifter 25.

It should be noted that a movable rack 56 opposite to the rack 45b is provided on the right side of the head carriage 18. The rack 45b is formed so as to have a length corresponding to a distance between the innermost track and the outermost track of the disc, that is, to extend in a length corresponding to the stroke of the head carriage 18. Accordingly, the rack 45b is engaged with the movable rack 56 so as to lock the carriage 18 by the carriage stopper 45 rotating in the direction E.

A stopper coupling lever 46 is rotatably supported by a shaft 44 provided on the frame 14. Additionally, the stopper coupling lever 46 has an arm portion 46a extending in the direction A and a spring engaging portion 56b extending in a side direction substantially perpendicular to the direction A. A root portion of the arm portion 46a is provided with an oblong engaging aperture 46c engaged with the protruding pin 45d protruding from the rear portion of the top surface of the body portion 45a of the carriage stopper 45.

The spring engaging portion 46b of the stopper coupling lever 46 is engaged with an end 47a of a torsion spring 47. Additionally, the other end 47b of the torsion spring 47 contacts a rear wall of the frame 14. Accordingly, the coupling lever 46 is urged by a spring force of the torsion spring 47 in the clockwise direction, that is, in a direction for engaging the carriage.

A solenoid 48 attracts a plunger 49 in the direction D is activated by an instruction provided by a control circuit (not shown in the figure) so as to attract the plunger 49 in the direction D. Additionally, an end of the plunger 49 is connected to an end of the arm portion 46a of the stopper coupling lever 46. Accordingly, when the solenoid 48 is activated and the plunger 49 is attracted in the direction D, the stopper coupling lever 46 is rotated in the counter clockwise direction, that is, in a direction for disengaging the carriage.

The right end of the plunger 49 serves as a lock member for engaging the slider 13 when the apparatus is in a recording and reproducing mode as described later.

Additionally, when the solenoid 48 cannot be activated due to a reason such as power failure, the stopper coupling lever 46 rotates in the clockwise direction, that is, in the direction for engaging the carriage since the plunger 49 returns in the direction C.

A holding member 50 presses and secures the guide shaft 24, the stopper coupling lever 46, the solenoid 48 and the torsion spring 47 by being fixed to the frame 14. The holding member 50 is formed of a metal plate.

A guide shaft pressing member 51 is secured to the frame 14 in a state in which the guide shaft pressing member 51 presses an end of the guide shaft 21 in the direction D perpendicular to an axial direction of the guide shaft 21.

A voice coil motor 52 is provided on a left side surface of the head carriage 18. The voice coil motor 52 is provided so as to be positioned on the left side of the guide shaft located near the center of gravity of the guide shaft 21. Accordingly, the head carriage 18 is moved in the directions A and B by a single voice coil motor 52 so as to have the magnetic heads 16 and 17 performing a seek operation. Accordingly, the head carriage 18 is miniaturized as compared to that provided in a structure in which a pair of voice coil motors are provided on opposite sides of the head carriage 18. Thus, a space of moving the carriage 18 is reduced, and the magnetic disc apparatus 11 is also miniaturized.

A description will now be given of peripheral parts of the head carriage 18.

Figure 5:
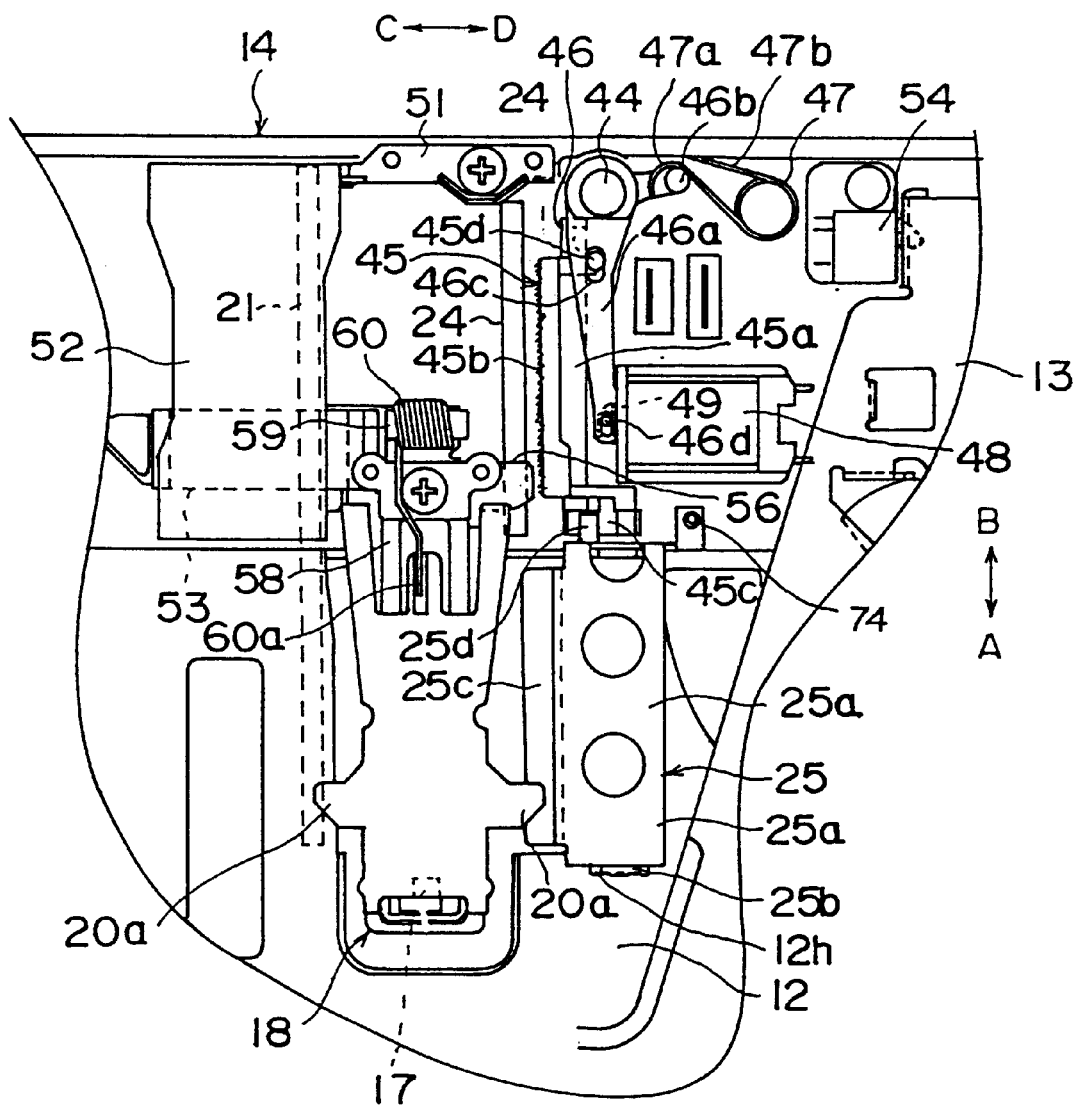
FIG. 5 is an enlarged plan view of a part near a head carriage in a recording and reproducing mode.

FIG. 5 is an enlarged plan view of a periphery of the head carriage 18 in the recording and reproducing mode.

As shown in FIG. 5, the head arm 20 is rotatably supported on a supporting table 57 of the head carriage 18 via a leaf spring 58 in upward and downward directions. Additionally, the head arm 20 is urged by a pressing portion 60a extending in the direction A from a torsion spring 60 in the downward direction. The torsion spring 60 is engaged with a shaft 59 provided on a rear portion of the supporting table 57 in a wounded state.

Accordingly, the protruding portion 20a of the head arm 20 protruding in the side direction is pressed against the upper surface of the engaging portion 25c of the lifter 25 by a spring force of the torsion spring 60. The lifter 25 intermittently rotates in association with a rotation of the carriage stopper 45 as described later since the engaging pin 25d is engaged with the V-shaped depressed portion 45c provided on an end of the carriage stopper 45.

The plunger 49 attracted by the solenoid 48 is engaged with the end 46d of the arm portion 46a of the stopper coupling lever 46. Additionally, the spring engaging portion 46b of the stopper coupling lever 46 is urged by a spring force of the torsion spring 47 in the clockwise direction. Thus, the stopper 45 having the protruding pin 45d engaging with the engaging aperture 46c of the stopper lever 46 rotates in the direction for engaging the carriage (direction E) by a spring force of the torsion spring 47. Thereby, the rack 45b of the carriage stopper 45 is engaged with the movable rack 56 of the head carriage 18, and the head carriage 18 is locked.

Additionally, the rear portion of the frame 14 is provided with a detection switch 54 which detects the slider moving in the ejecting direction. The eject detection switch 54 is switched to a closed state by being pressed by an end of the slider 13 moving in the direction B when the eject button 40 is pressed in the direction B.

A description will now be given of a disc loading operation of the magnetic disc apparatus 11 having the above-mentioned construction.

As shown in FIG. 1 and FIG. 4, when the disc cartridge (not shown in the figure) is inserted into the disc holder 12 through the disc insertion opening 26 of the front bezel 27, the latch lever 38 is pressed and rotated in the clockwise direction. Then, the engaging portion 38b of the latch lever 38 is separated from the engaged portion 13h of the slider 13, the slider 13 which is urged by the coil spring 41 moves in the direction A.

When the latch lever 38 moves in the direction A as mentioned above, the slider 13 is disengaged and the end 38c of the lever portion 38a opens the shutter (not shown in the figure) of the disc cartridge.

The disc holder 12 is movably supported only in upward and downward directions with respect to the left and right sides of the frame 14. Accordingly, when the slider 13 moves in the direction A, the disc holder 12 moves downwardly from the cartridge insertion/eject position to the cartridge loading position since the engaging pins 12e of the disc holder 12 move along the slanting grooves 13d.

Figure 6:
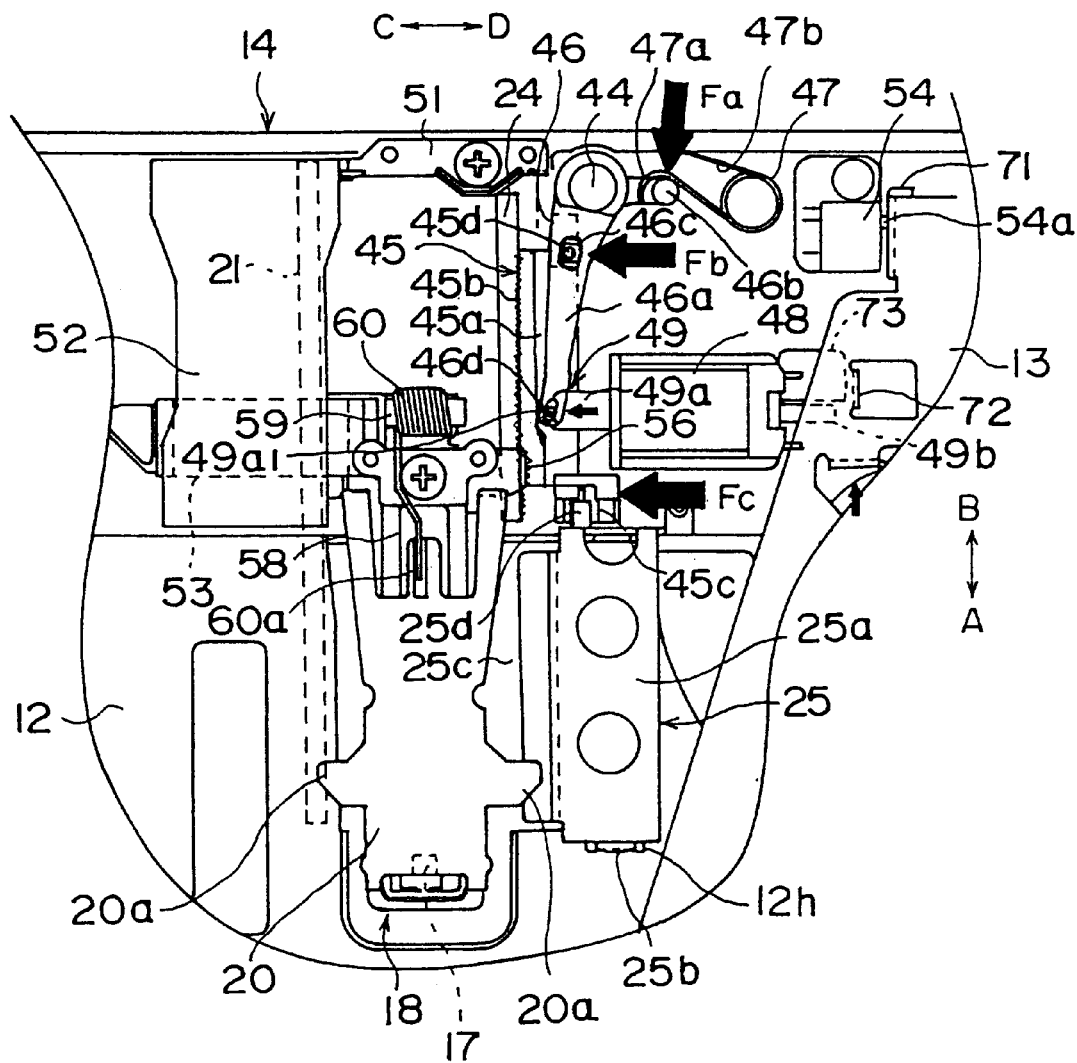
FIG. 6 is an enlarged plan view of the head carriage in an eject mode.

FIG. 6 is an enlarged plan view of a periphery of the head carriage 18 in an eject mode.

As shown in FIG. 6, in the eject mode, an end of the slider extending in the direction B contacts the eject detection switch 54 so as to close the eject detection switch 54. Accordingly, the eject detection switch 54 outputs an eject detection signal to the control circuit (not shown in the figure). Thereby, the solenoid 48 moves the plunger 49 in the direction C.

Additionally, since the solenoid 48 is not activated in the eject mode, the stopper coupling lever 46 is rotated by the spring force Fa of the torsion spring 47 in the clockwise direction. Accordingly, the carriage stopper 45 is rotated toward the head carriage 18, and, thus, the rack 45b is engaged with the movable rack 56 of the head carriage 18.

Additionally, the spring force Fa of the torsion spring 47 serves as a pressing force Fb which presses the protruding pin 45d in the direction C, the protruding pin 45d being engaged with the engaging aperture 46c of the stopper coupling lever 46.

Since the head carriage 18 is driven by the voice coil motor 52 in the directions A and B, there is not restriction to the head carriage 18 when the drive force is not provided by the voice coil motor due to some reasons such as power failure and, thus, the head carriage 18 can freely moves. However, in the eject mode, since the rack 45b of the carriage stopper 45 is engaged with the movable rack 56 of the head carriage 18 so as to lock the head carriage 18, the head carriage is prevented from moving freely.

Additionally, when power failure occurs in other operational modes, the drive force of the voice coil motor 52 is not provided similar to the above-mentioned condition, and the solenoid 48 is deactivated. Thereby, the head carriage is locked and is prevented from moving freely.

Figure 7:
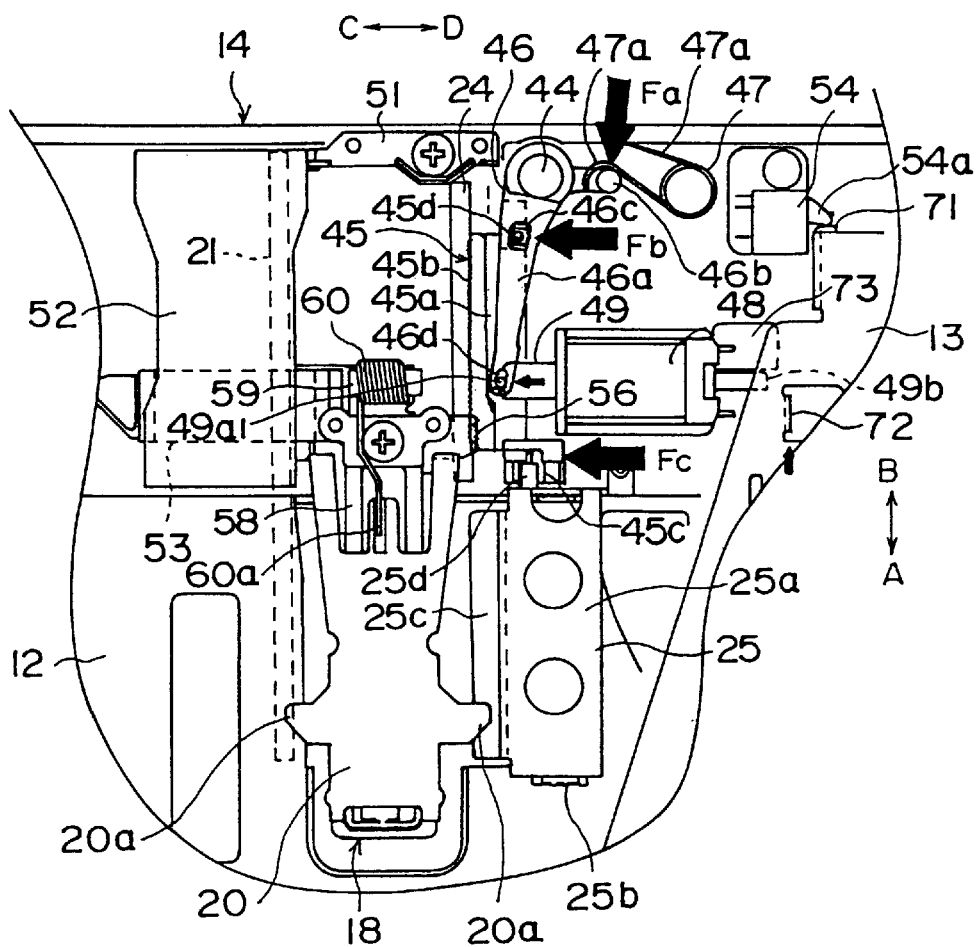
FIG. 7 is an enlarged plan view of a part near the head carriage.

FIG. 7 is an enlarged plan view of the periphery of the head carriage 18 in the recording and reproducing mode.

As shown in FIG. 7, when the apparatus is in the recording and reproducing mode and in a waiting state such as a standby state or a sleep state, the head carriage is not needed to perform a seek operation. In such a case, the solenoid 48 is deactivated. Thereby, similar to the above-mentioned eject mode shown in FIG. 6, the stopper coupling lever 46 is rotated by the spring force Fa of the torsion spring 47 in the clockwise direction. Thereby, the carriage stopper 45 is rotated toward the head carriage 18. Thus, the rack 45b of the carriage stopper 45 is engaged with the movable rack 56 of the carriage 18.

Thereby, when the apparatus is in the waiting state in the recording and reproducing mode, the head carriage 18 is locked in a state in which the head carriage 18 cannot move in the directions A and B.

It should be noted that even when the apparatus is in the waiting state in the recording and reproducing mode, and when the solenoid valve 48 is deactivated, similar to the above-mentioned eject mode, the plunger 49 is moved in the direction C by the spring force Fa of the torsion spring 47. Thus, the right side end 49b of the plunger 49 is separated from the engaging portion 72 of the slider 13. Accordingly, the slider in the eject mode is in an unlocked state.

A description will now be given of an operation of the head arm 20 associated with operations of the carriage stopper 45, the stopper coupling lever 46, the torsion spring 47 and the solenoid 48.

Figure 8:
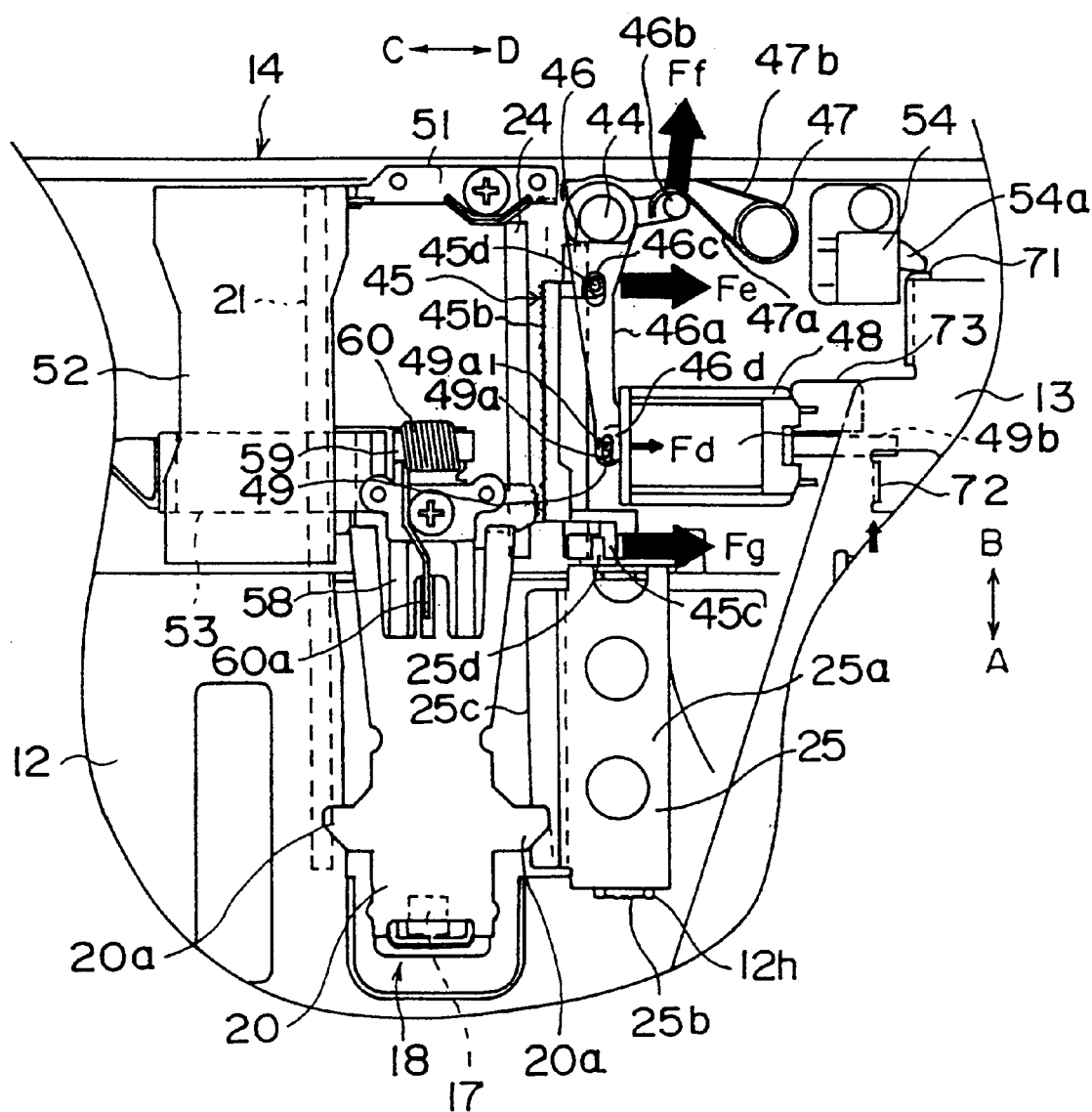
FIG. 8 is an enlarged plan view of a part near the head carriage when a seek operation is performed in the recording and reproducing mode.

FIG. 8 is an enlarged plan view of the periphery of the head carriage when a seek operation is performed in the recording and reproducing mode.

As shown in FIG. 8, when the disc cartridge inserted into the disc holder 12 moves to the recording and reproducing position in the recording and reproducing mode, a disc sensor (not shown in the figure) is turned on. Then, after a rotational speed of the disc motor (not shown in the figure) reaches a specified high speed, the solenoid 48 is activated.

Accordingly, in the recording and reproducing mode, the solenoid 48 is activated and attracts the plunger 49 in the direction D. Thereby, the stopper coupling lever 46 connected to the plunger 49 is rotated in the counterclockwise direction, and the rack 45b of the carriage stopper 45 is separated from the movable rack 45c of the head carriage 18. As a result, the lock of head carriage 18 by the carriage stopper 45 is released.

Accordingly, the head carriage 18 performs a seek operation in a radial direction of the disc by a drive force of the voice coil motor 52, and, thereby, the magnetic heads 16 and 17 can be opposed to a desired track.

The plunger 49 is attracted by the activation of the solenoid 48 in the direction D. Since the plunger 49 is engaged with the end 46d of the arm portion 46a of the stopper coupling lever 46, the attracting force Fd is increased by according to a principle of a lever and is converted into pressing forces Fe and Ff which are exerted on the protruding pin 45d and the torsion spring 47. The protruding pin 45d is engaged with the engaging aperture 46c provided in the middle of the arm portion 46a in the longitudinal direction. Additionally, the attracting force Fd of the solenoid 48 is converted into a pressing force Fg which is applied from the V-like depressed portion 45c of the carriage stopper 45 to the engaging pin 25d of the lifter 25 in the direction D.

Accordingly, even if the attracting force Fd of the solenoid 48 is small, the attracting force Fd is increased and transmitted to the carriage stopper 45 and the lifter 25, and, thereby, a sufficiently large drive force can be obtained even when the solenoid 48 is small. Thus, a power consumption of the solenoid 48 is reduced, and a space for the solenoid 48 can be reduced which results in a miniaturization of the apparatus.

In the recording and reproducing mode, since the plunger 49 is attracted by the solenoid 48 in the direction D as mentioned above, the right side end portion 49b of the plunger 49 moves to a position in which the right side end portion 49b contacts the engaging portion 72 of the slider 13. Thus, in the recording and reproducing mode, the end of the engaging portion 72 of the slider 13 in the direction B makes contact with the right side end portion 49b of the plunger 49 in the direction B, and, thereby, the slider 13 is set in a locked state in which the slider 13 is restricted from moving in the direction B.

Additionally, the rear side of the right side end portion 49b of the plunger 49 is provided with a rectangular stopper 73 protruding from the frame 14. The stopper 73 is provided for reinforcing the right side end portion 49b against a pressing force in the direction B. Accordingly, when the right side end portion 49b of the plunger 49 is subjected to a deformation in the direction B by being pressed by the engaging portion 72 of the slider 13, the right side end portion 49b contacts the stopper 73 and is prevented from being subjected to a further deformation.

Accordingly, when the eject button 40 is pressed in the recording and reproducing mode, the engaging portion 72 of the slider 13 contacts the right side end portion 49b of the plunger 49 and is prevented from moving further in the eject direction (direction B). Accordingly, the disc cartridge is prevented from being ejected when information is being recorded on the magnetic disc by the magnetic heads 16 and 17 or when information recorded on the magnetic disc is being read by the magnetic heads 16 and 17. Thus, information to be recorded on the magnetic disc is prevented from being lost.

Additionally, in the present embodiment, the head carriage 18 or the slider 13 can be selectively locked by turning on or off the solenoid 48 in response to an operational state of the magnetic disc apparatus 11. Accordingly, in the magnetic disc apparatus 11, solenoid 48 alone can selectively lock the head carriage 18 as a head moving mechanism or the slider 13 as a recording medium conveying mechanism. Additionally, a locked state can be switched with a good response, and a delay in a locking operation can be prevented.

FIGS. 9A, 9B and 9C are front views for explaining an operation of the carriage stopper 45 with respect to the head carriage 18

FIG. 9A shows an operational state in the eject mode in which the stopper coupling lever 46 is pressed in the direction C by the spring force of the torsion spring 47. Accordingly, the carriage stopper 45 is rotated by the spring force of the torsion spring 47 in the direction E, and the rack 45b is engaged with the movable rack 56 of the head carriage 18. Accordingly, the head carriage 18 is locked by the carriage stopper 45.

FIG. 9B shows an operational state in the waiting mode. In the waiting mode, similar to the eject mode, the stopper coupling lever 46 is pressed in the direction C by the spring force of the torsion spring 47. Accordingly, the carriage stopper 45 is rotated in the direction E by the spring force of the torsion spring 47, and the rack 45b is engaged with the movable rack 56 of the head carriage 18 so as to lock the head carriage 18.

FIG. 9C shows an operational state in the recording and reproducing mode. In the recording and reproducing mode, the solenoid 48 is activated as mentioned above, and the stopper coupling lever 46 is driven in the direction D. Accordingly, the carriage stopper 45 is rotated by the drive force of the solenoid 48 in the direction F and the rack 45b is separated from the movable rack 56 of the head carriage 18 which unlocks the head carriage. Thereby, the head carriage 18 is able to perform a seek operation in the directions A and B.

FIGS. 10A, 10B and 10C are front views for explaining operations of the carriage stopper 45 and the lifter 25 with respect to the head arm 20.

FIG. 10A shows an operational state in the eject mode in which the carriage stopper 45 is rotated by the spring force of the torsion spring 47 in the direction E and the rack 45b is engaged with the movable rack 56 of the head carriage 18. Since the disc holder 12 is lifted at the disc insertion/eject position, the lifter 25 is also lifted.

Additionally, an adjusting bolt 74 for adjusting a height of the lifter 25 is screwed into the holding member 61. A bottom end of the adjusting bolt 74 contacts the contacting portion 75 extending from an end of the lifter 25. Accordingly, the adjusting bolt 74 can adjust an amount of lift of the lifter 25 by changing an amount of screwed portion of the adjusting bolt 74 into the holding member 61.

Additionally, in a process in which the disc holder 12 is lifted to the disc insertion/eject position, the contacting portion 75 integrally provided on the lifter 25 contacts a lower end of the adjusting bolt 74. The lifter 25 is supported on the top surface of the disc holder 12 so as to swing in the directions E and F with a shaft 25c as a center of the swing. Accordingly, the lifter 25 is rotated in the direction F by the contacting portion 75 contacting the lower end of the adjusting bolt 74 in association with the upward movement of the disc holder 12, the contacting portion 75 extending in the right direction of the lifter 25.

Additionally, the engaging portion 25c provided on the left side of the lifter 25 is engaged with the protruding portion 20a protruding from a side of the head arm 20. Accordingly, the lifter 25 is rotated in the direction F in association with the upward movement of the disc holder 12 so as to lift the protruding portion 20a of the head arm 20. Thereby, the head arm 20 is meld at an upper position in which the upper magnetic head 17 is separated from the lower magnetic head 16.

Additionally, the engaging pin 25d of the lifter 25 is separated from the V-like depressed portion 45c of the carriage stopper 45.

FIG. 10B shows an operational state in the waiting mode. In the waiting mode, the head arm 20 temporarily stops at a position between the disc insertion/eject position and the disc loading position. That is, engaging pin 25d protruding from the end of the lifter 25 in the direction B enters the V-like depressed portion 45c of the carriage stopper 45 in association with the upward movement of disc holder 12. Thus, the engaging pin 25d of the lifter 25 is received by the V-like depressed portion 45c of the carriage stopper 45, and is made contact with a slanting portion of the V-like depressed portion 45c.

Accordingly, the lifter 25 is stopped at a middle position between the disc insertion/eject position and the disc loading position. Thus, the rotation of the head arm associated with the lifter 25 is temporarily stopped.

In the waiting mode, since the head arm 20 is stopped at the middle position before the disc loading position, the magnetic head 17 supported on the end of the head arm 20 faces the magnetic head 16 supported on the end portion of the head carriage body 19 with a predetermined distance S. Thus, the upper magnetic head 17 is positioned above the magnetic disc (not shown in the figure).

The lower magnetic head 16 does not contact the magnetic disc until the disc holder 12 moves down to the disc loading position. However, when the head arm 20 is rotated downwardly in association with the downward movement of the disc holder 12, the magnetic disc pressed by the upper magnetic head 17 is instantaneously contacts the lower magnetic head 16.

FIG. 10C shows an operational state in the recording and reproducing mode. In the recording and reproducing mode, the solenoid 48 is activated as mentioned above and the stopper coupling lever 46 is driven in the direction D. Thereby, the carriage stopper a 45 is rotated by the drive force of the solenoid 48 in the direction F, and the rack 45b is separated from the movable rack 56 of the head carriage 18. As a result, the head carriage 18 is unlocked.

When the carriage stopper 45 rotates in the direction F, the V-like depressed portion 45c of the carriage stopper 45 pressed the engaging pin 25d in the direction E. Thus, the lifter 25 rotates in the direction E in association with the rotation of the carriage stopper 45 in the direction F, and the engaging portion 25c of the lifter 25 moves downward.

Accordingly, the head arm 20 also moves downward. Thus, the magnetic head 17 supported by the head arm 20 contacts the magnetic disc so that the magnetic disc is sandwiched between the magnetic head 16 and 17 after the magnetic head 17 temporarily stops at a position close to the magnetic disc in the above-mentioned waiting state.

As mentioned above, since the magnetic head 17 moves with a stepwise motion to the recording and reproducing position in which the magnetic head 17 slides on the magnetic disc, a shock applied to the magnetic disc rotating at a high speed is reduced, and the magnetic film formed on the magnetic disc is prevented from being damaged.

It should be noted that the eject operation is a reverse operation of the above-mentioned loading operation, and a description thereof will be omitted.

Figure 11:
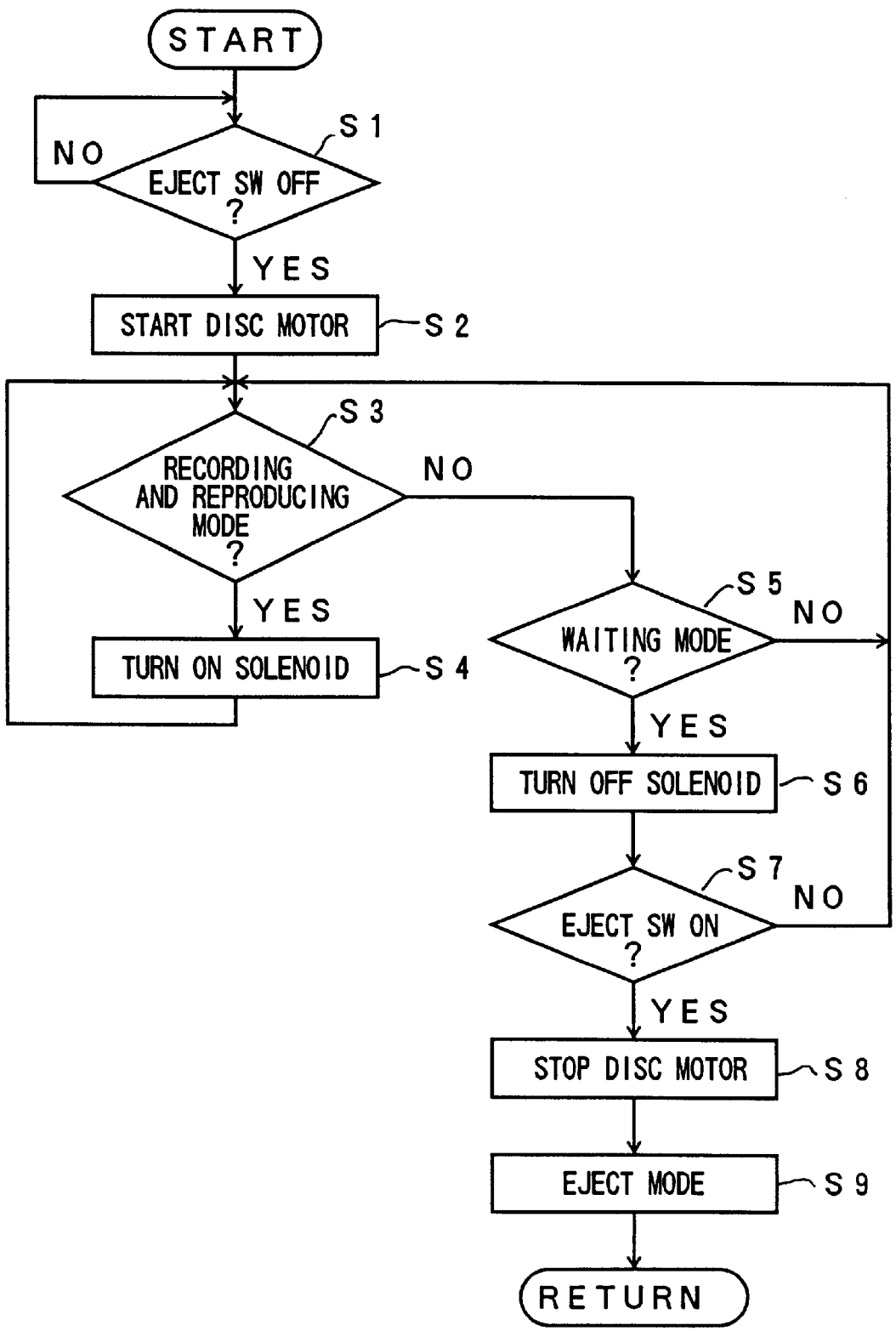
FIG. 11 is a flowchart for explaining a process performed by a control circuit.

FIG. 11 is a flowchart for explaining a process performed by the control circuit.

In FIG. 11, in step S1 (hereinafter "step" is omitted), it is determined whether or not the eject detection switch 54 is turned off. That is, when the disc cartridge is inserted, the slider 13 moves in the direction A and the end portion 71 is separated from a movable contact 54a of the eject detection switch 54. Accordingly, the eject detection switch 54 is changed to an OFF state in association with the loading operation of the disc cartridge.

If it is determined, in S1, that the eject detection switch 54 is in the OFF state, the routine proceeds to S2. In S2, the disc motor (not shown in the figure) rotating the turntable 15 is started to rotate the magnetic disc.

Thereafter, it is determined, in S3, whether or not the magnetic disc 11 is set to the recording and reproducing mode. If it is determined, in S3, that the magnetic disc apparatus 11 is set to the recording and reproducing mode, the routine proceeds to S4 so as to activate the solenoid 48 to attract the plunger 49 in the direction D.

Accordingly, the carriage stopper 45 is separated from the head carriage 18 by the attracting force of the solenoid 48 which unlocks the head carriage 18. Thus, a recording and reproducing operation can be performed by the magnetic heads 16 and 17, and the right side end portion 49b of the plunger 49 moves to a position in which the right side end portion 49b contacts the engaging portion 72 of the slider 13 in the direction B. Accordingly, in the recording and reproducing mode, the engaging portion 72 of the slider 13 contacts the right side end portion 49b of the plunger 49, and the slider 13 is in the locked state in which a movement in the direction B is restricted.

Accordingly, the eject operation in the recording and reproducing mode is prohibited, and the information to be recorded is prevented from being lost or information to be read is prevented from being unreadable in the middle of the reading operation. The process of S3 and S4 is repeated until the recording and reproducing mode is terminated.

Additionally, when the recording and reproducing mode is terminated and switched to the waiting mode, the routine proceeds from S3 to S5 so as to determined whether or not the waiting mode is set. If it is determined, in S5, that the waiting mode is set, the routine proceeds to S6 so as to turn off (deactivate) the solenoid 48. Thereby, the plunger 49 which has been attracted by the solenoid 48 is moved in the direction C by the spring force of the torsion spring 47 so a to unlock the slider 13. At the same time, the carriage stopper 45 is moved toward the head carriage 18 and the rack 45b is engaged with the movable rack 56 to lock the head carriage 18.

It should be noted that is it is determined, in S5, that the waiting mode is not set, the routine returns to S3 so as to recheck the operational state.

Then, it is determined, in S7, whether or not the eject detection switch 54 is turned on. That is, when the eject button 40 is pressed in the eject position (direction B) and the slider 13 is moved in the direction B, the end portion 71 contacts the movable contact 54a of the eject detection switch 54 and the eject detection switch is changed to an ON state.

Accordingly, if it is determined, in S7, that the eject detection switch is turned on, the routine proceeds to SS8 so as to immediately stop the disc motor (not shown in the figure) rotating the turntable 15. Thereafter, in S9, the eject mode is set.

On the other hand, if it is determined, in S7, that the eject detection switch 54 is turned off, the routine returns to S3 so a to recheck the operational state.

The disc motor stopping process in S8 may be performed between S6 and S7.

Figure 12:
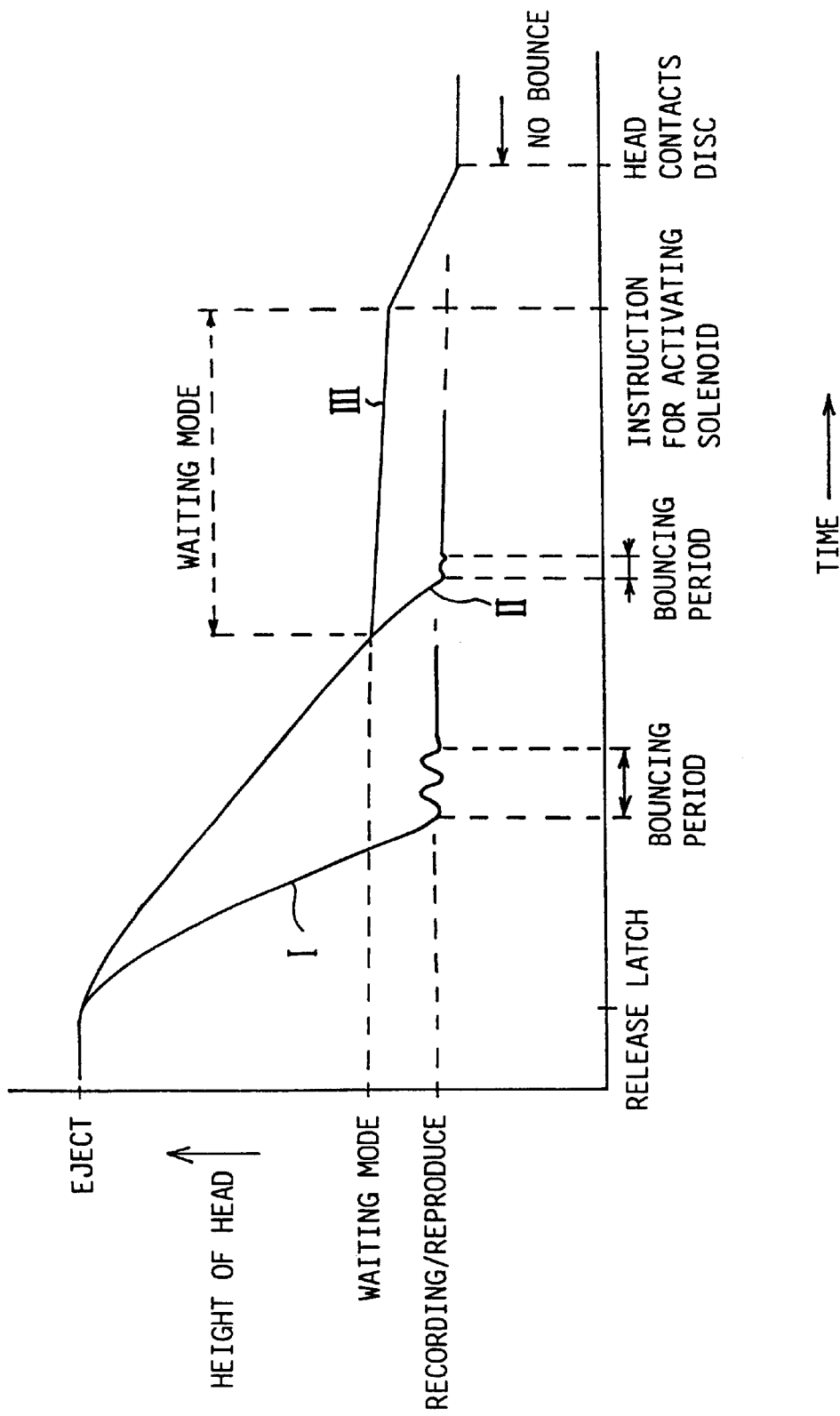
FIG. 12 is a graph of a result of experiments showing a change in a height of the magnetic head associated with a disc lading operation.

FIG. 12 is a graph of a result of experiments showing changes in a height of the magnetic head 17 associated with a disc loading operation. In FIG. 12, a curve I indicates a characteristic of a conventional apparatus which does not have a damper. A curve II indicates a characteristic of a conventional apparatus having a damper mechanism. Additionally, a curve III indicates a characteristic of the apparatus according to the present invention in which the head arm 20 is stepwisely moved downward.

Comparing the curves I, II and III, it is appreciated that the following differences exist.

In the case of the curve I, since a damper is not provided, a disc holder and a head arm are rapidly move downward in association with a movement of a slider. Accordingly, in the magnetic disc apparatus having no damper, an upper magnetic head supported on a head arm is powerfully moved downward by a loading operation of the disc cartridge and the magnetic disc is pressed to a lower magnetic head.

As a result, the upper magnetic head is bounced due to a reaction force when the upper magnetic head collide with the magnetic disc above the lower magnetic head, and the collision of the upper magnetic head and the lower magnetic head is repeated. This may damage the magnetic film formed on the magnetic disc.

In the case of the curve II of the magnetic disc apparatus having a damper, although a speed of operation of the magnetic head is reduced, the reduction in the speed by the damper is not sufficient since the disc holder and the head arm move downward all the way from the disc insertion/eject position to the disc loading position. Accordingly, although the loading operation of the disc cartridge is slowed down, the magnetic head contacts the magnetic disc while the magnetic head is accelerated. Thus, although a downward speed of the magnetic head of the magnetic disc apparatus having a damper is smaller that that of the magnetic disc apparatus having no damper, the collision of the magnetic heads with the magnetic disc is repeated since the reduction in the speed of the head arm is not sufficient. Thereby, there is a high possibility that the magnetic film formed on the magnetic disc is damaged.

On the other hand, when a speed of movement of the slider 13 is reduced by the mechanical damper 31 and the head arm 20 is stepwisely moved as in the present invention, the speed of movement of the magnetic head 17 is stepwisely changed as shown by curve III of FIG. 12 and is slower than that of the above-mentioned conventional apparatuses.

In the case of the magnetic disc apparatus 11 according to the present invention, as explained with reference to FIGS. 10A, 10B and 10C, the movement of the lifter 25 and the head arm 20 is temporarily stopped at a position between the disc insertion/eject position and the disc loading position in the waiting mode.

That is, in the waiting mode, the magnetic head 17 supported on the end of the head arm 20 is stopped at the middle position close to the magnetic disc, but, the lower magnetic head 16 is in contact with the magnetic disc since the disc holder is at a lowered position. However, since the magnetic disc contacts the magnetic head 16 by only its own weight, no damage occurs in the magnetic disc. When the rotational speed of the disc motor rotating the turntable 15 reaches a specified speed in the waiting mode, the solenoid 48 is activated to unlock the head carriage 18 and at the same time the downward movement of the lifter 25 and the head arm 20 is restarted.

When the head arm 20 rotates downward in association with the downward movement of the lifter 25, the upper magnetic head 17 instantaneously contacts the magnetic disc pressed by the magnetic head 16. However, since an acceleration generated in the magnetic head 17 during movement from the middle position at which the magnetic head 17 is stopped in the waiting mode to the position in which the magnetic head 17 contacts the magnetic disc is small, the a shock applied to the magnetic disc by the magnetic head 17 is small.

Accordingly, since the magnetic head 17 contacts the magnetic head at a slow speed starting from the position close to the magnetic disc, the magnetic head 17 does not bounce when the magnetic head 17 contacts the magnetic disc. Thus, the magnetic film of the magnetic disc is positively prevented from being damaged.

Additionally, as interpreted from the curve III, the downward movement of the head arm 20 in the waiting mode is temporarily stopped, and, thereby, the speed of the magnetic head 17 when the magnetic head contacts the magnetic disc is sufficiently reduced. Additionally, since the solenoid 48 is activated to move the magnetic head 17 downwardly after electrically detecting the speed of the disc motor for driving the turntable 15 in the waiting mode, the magnetic head receives a floating force due to air flow on the surface of the magnetic disc when the magnetic head 17 contacts the magnetic disc. Thereby, a shock between the magnetic head 17 and the magnetic disc is reduced.

It should be noted that, in the above-mentioned embodiment, although the description is given of the magnetic disc apparatus as an example, the present invention is not limited to this and is applied to other recording and reproducing apparatuses such as an optical disc apparatus, a magnetooptical disc apparatus or a recording and reproducing apparatus using a card-like recording media such as a memory card.

Additionally, in the above-mentioned embodiment, although the description is given of the slider moving above the disc holder as an example, the present invention is not limited to this and, for example, the present invention can be applied to a structure in which the slider moves under the disc holder.

The present invention is not limited to the specifically disclosed embodiments, and variations and modifications may be made without departing from the scope of the present invention.

The present application is based on Japanese priority applications No.9-312364 filed on Nov. 13, 1997 and No.9-312365 filed on Nov. 13, 1997, the entire contents of which are hereby incorporated by reference.

What is claimed is:

1. A recording medium recording and reproducing apparatus, comprising:

a recording medium conveying mechanism for conveying a recording medium from an insertion/eject position to a loading position, the recording medium being inserted or ejected at said insertion/eject position, the recording medium being loaded for a recording or reproducing operation at said loading position;

a head for writing information on the recording medium or reading information recorded on the recording medium; and a head moving mechanism for moving said head from an uppermost position to a recording and reproducing position and to a waiting position located between said uppermost position and said recording and reproducing position, said head being located at said uppermost position when said recording head does not perform a recording or reproducing operation, and being located at said recording and reproducing position when said head performs a recording or reproducing operation, said head being moved in association with conveyance of the recording medium by said recording medium conveying mechanism with said head being stopped at said waiting position and with said recording medium being in said loading position when the head is at the waiting position and before moving said head to said recording and reproducing position, wherein the distance between the recording medium at the loading position and the waiting position is smaller than the distance between the recording medium at the loading position and the uppermost position; and wherein said head moving mechanism stepwisely moves said head from said uppermost position to said recording and reproducing position so that said head stops at said waiting position between said uppermost position and said recording and reproducing position.

2. The recording medium recording and reproducing apparatus as claimed in claim 1, wherein said recording medium is a magnetic disc and said head is a magnetic head magnetically performing a recording or reproducing operation.

3. The recording medium recording and reproducing apparatus as claimed in claim 1, wherein said recording medium is a disc-like recording medium, and said head moving mechanism moves said head to said recording and reproducing position when said recording medium is rotated at a predetermined speed.

4. The recording medium recording and reproducing apparatus as claimed in claim 1, wherein operational modes of said recording medium recording and reproducing apparatus include an eject mode for ejecting the recording medium and a waiting mode for stepwisely moving said head, and wherein said head moving mechanism locks said head when said recording medium recording and reproducing apparatus is set to one of said eject mode and said waiting mode.

5. The recording medium recording and reproducing apparatus as claimed in claim 1, wherein said head moving mechanism locks said recording medium conveying mechanism when said head is located at said recording and reproducing position and said waiting position.

6. The recording medium recording and reproducing apparatus as claimed in claim 1, wherein said recording medium conveying mechanism comprises:

a holder for holding said recording medium;

a slider for moving said holder between said disc insertion/eject position and said loading position; and a lock member for locking said head moving mechanism when said head is at a position other than said recording and reproducing position, said lock member locking said slider when said holder is at said loading position.

7. The recording medium recording and reproducing apparatus as claimed in claim 6, wherein said lock member includes a solenoid and a plunger moved by said solenoid, and said plunger selectively locks one of said head moving mechanism and said recording medium conveying mechanism according to a position thereof.

* * * * *